United States Patent
Zohar et al.

(10) Patent No.: US 7,293,156 B2
(45) Date of Patent: Nov. 6, 2007

(54) DISTRIBUTED INDEPENDENT CACHE MEMORY

(75) Inventors: Ofir Zohar, Alfe-Menashe (IL); Yaron Revah, Tel-Aviv (IL); Haim Helman, Ramat Gan (IL); Dror Cohen, Petach-Tikva (IL)

(73) Assignee: XIV Ltd., Tel Aviv (IL)

( * ) Notice: Subject to any disclaimer, the term of this patent is extended or adjusted under 35 U.S.C. 154(b) by 481 days.

(21) Appl. No.: 10/620,249

(22) Filed: Jul. 15, 2003

(65) Prior Publication Data

US 2005/0015567 A1 Jan. 20, 2005

(51) Int. Cl.
*G06F 12/00* (2006.01)
(52) U.S. Cl. ...................... 711/206; 711/211
(58) Field of Classification Search ........... 711/203, 711/104, 105, 111, 112, 206, 207, 221; 709/217, 709/219, 203, 226
See application file for complete search history.

(56) References Cited

U.S. PATENT DOCUMENTS

| | | | |
|---|---|---|---|
| 5,694,576 A | 12/1997 | Yamamoto et al. | |
| 6,434,666 B1 | 8/2002 | Takahashi et al. | |
| 6,457,102 B1 | 9/2002 | Lambright et al. | |
| 6,490,615 B1 | 12/2002 | Dias et al. | |
| 6,601,137 B1 * | 7/2003 | Castro et al. | 711/113 |
| 6,654,850 B2 * | 11/2003 | Fox et al. | 711/111 |
| 6,898,666 B1 * | 5/2005 | Henry et al. | 711/114 |
| 6,957,300 B2 * | 10/2005 | Olds et al. | 711/112 |
| 2001/0049773 A1 | 12/2001 | Bhavsar | |
| 2002/0194429 A1 | 12/2002 | Chiu et al. | |
| 2003/0101317 A1 | 5/2003 | Mizuno et al. | |
| 2003/0149838 A1 * | 8/2003 | Mowery et al. | 711/113 |
| 2003/0159001 A1 | 8/2003 | Chalmer et al. | |
| 2004/0205092 A1 * | 10/2004 | Longo et al. | 707/205 |

OTHER PUBLICATIONS

European Search Report dated Jan. 8, 2007, from corresponding European Application 04254198.7-1238.

* cited by examiner

*Primary Examiner*—Brian R. Peugh
(74) *Attorney, Agent, or Firm*—Katten Muchin Rosenman LLP (57) ABSTRACT

A system for transferring data to and from one or more slow-access-time-mass-storage nodes which store data at respective first ranges of logical block addresses (LBAs), including a plurality of interim-fast-access-time nodes which are configured to operate independently of one another. Each interim-fast-access-time node is assigned a respective second range of the LBAs and is coupled to receive data from and provide data to the one or more slow-access-time-mass-storage nodes within the respective second range.

The system further includes one or more interface nodes, which are adapted to receive input/output (IO) requests from host processors directed to specified LBAs and to direct all the IO requests to the interim-fast-access-time node to which the specified LBAs are assigned.

65 Claims, 5 Drawing Sheets

DISTRIBUTED INDEPENDENT CACHE MEMORY

CROSS-REFERENCE TO RELATED APPLICATION

This application is related to the application titled "Data Allocation in a Distributed Storage System," filed on even date, which is assigned to the assignee of the present application, and which is incorporated herein by reference.

FIELD OF THE INVENTION

The present invention relates generally to memory access, and specifically to distributed cache design in data storage systems.

BACKGROUND OF THE INVENTION

The slow access time, of the order of 5-10 ms, for an input/output (IO) transaction performed on a disk has led to the need for a caching system between a host generating the IO transaction and the disk. A cache, a fast access time medium, stores a portion of the data contained in the disk. The IO transaction is first routed to the cache, and if the data required by the transaction exists in the cache, it may be used without accessing the disk.

One goal of an efficient caching system is to achieve a high "hit" ratio, where a high proportion of the data requested by IO transactions already exists in the cache, so that access to the disk is minimized. Other desirable properties of an efficient caching system include scalability, the ability to maintain redundant caches and/or disks, and relatively few overhead management transactions.

U.S. Pat. No. 5,694,576 to Yamamoto, et al., whose disclosure is incorporated herein by reference, describes a method for controlling writing from a cache to a disk by adding record identification information to a write request. The added information enables the cache to decide whether data written to the cache should or should not be written to the disk.

U.S. Pat. No. 6,457,102 to Lambright, et al., whose disclosure is incorporated herein by reference, describes a system for storing data in a cache memory that is divided into a number of separate portions. Exclusive access to each of the portions is provided by software or hardware locks. The system may be used for choosing which data is to be erased from the cache in order to make room for new data.

U.S. Pat. No. 6,434,666 to Takahashi, et al., whose disclosure is incorporated herein by reference, describes a caching system having a plurality of cache memories, and a memory control apparatus that selects the cache memory to be used. The memory control apparatus selects the cache so as to equalize use of the cache memories.

U.S. Pat. No. 6,490,615 to Dias, et al., whose disclosure is incorporated herein by reference, describes a scalable cache having cache nodes for storage servers. On receipt of a read request, the cache nodes serve the request or communicate with each other to cooperatively serve the request.

SUMMARY OF THE INVENTION

It is an object of some aspects of the present invention to provide a method and apparatus for distributed caching of data.

In preferred embodiments of the present invention, a data transfer system comprises one or more interface nodes and a plurality of fast access time cache nodes. The data transfer system transfers data to and from one or more slow access time mass storage nodes, typically disks, the mass storage nodes storing data at logical block addresses (LBAs). The data transfer system and the mass storage nodes together form a data storage system. The data storage system is coupled so that it may be accessed, via the interface nodes, for input/output (IO) transactions by one or more hosts. Each interface node is adapted to communicate directly with all of the cache nodes. The cache nodes are all configured to be at the same hierarchical level and operate independently of each other.

Each cache node communicates with the one or more mass storage nodes and is assigned a range of LBAs, so that together the cache nodes cover the complete LBA range of the mass storage nodes. An IO request from one of the hosts to specific LBAs is received by one of the interface nodes, and the interface node converts the IO request into separate LBA requests and/or one or more groups of LBA requests and directs each LBA request or group of requests to the cache node to which the LBA or group is assigned. The cache nodes then respond to their LBA requests by transferring data between cache nodes and the one or more mass storage nodes, and/or between cache nodes and the interface node. The use of hierarchically equal cache nodes, with a certain range of LBAs assigned to each of the nodes, provides a data transfer system with a number of distinct advantages:

Since the cache nodes operate independently of one another, very little management overhead is required for the complete system;

Consequently, the transfer system is also scalable without substantial increase in overhead;

Each cache node may be assigned a range of LBAs so that the IO load may be well balanced among the nodes, which in turn improves the overall hit ratio for the cache nodes.

Coupling between the interface nodes and the cache nodes is preferably by means of a first fast data switch. Coupling between the mass storage nodes and the cache nodes is preferably by means of a second fast data switch. Alternatively, the couplings may use busses, or any other suitable media known in the art.

Each interface node translates IO access requests into LBA requests according to a mapping stored in the node. The interface node transmits the LBA requests to the cache nodes assigned to receive the LBAs. The mapping for each interface node is substantially the same. Adding a cache node to the system, or removing one from the system, simply requires updating the mapping stored in each interface node.

There is therefore provided, according to a preferred embodiment of the present invention, a storage system, including:

one or more slow-access-time-mass-storage nodes, coupled to store data at respective first ranges of logical block addresses (LBAs);

a plurality of interim-fast-access-time nodes, configured to operate independently of one another, each interim-fast-access-time node being assigned a respective second range of the LBAs and coupled to receive data from and provide data to the one or more slow-access-time-mass-storage nodes having LBAs within the respective second range; and one or more interface nodes, which are adapted to receive input/output (IO) requests from host processors directed to specified LBAs and to direct all the IO requests to the interim-fast-access-time node to which the specified LBAs are assigned.

Preferably, the one or more interface nodes include a mapping between the interim-fast-access-time nodes and the LBAs, and the one or more interface nodes are adapted to convert the IO requests to one or more requests and to direct the one or more requests to respective one or more interim-fast-access-time nodes in response to the mapping. The mapping preferably consists of a function relating each specific interim-fast-access-time node of the plurality of interim-fast-access-time nodes to the respective second range of the LBAs. Alternatively, the mapping consists of a table relating each specific interim-fast-access-time node of the plurality of interim-fast-access-time nodes to the respective second range of the LBAs.

The data is preferably allocated into groups of data within the one or more slow-access-time-mass-storage nodes according to a pre-defined unit of the storage system consisting of an integral number of bytes of the data, and the mapping includes a correspondence between the interim-fast-access-time nodes and the groups of data.

The one or more slow-access-time-mass-storage nodes preferably include one or more disks, and the interim-fast-access-time nodes preferably include random access memories.

Preferably, the plurality of interim-fast-access-time nodes include respective location tables, wherein each location table includes locations of the second range of the LBAs assigned to the respective interim-fast-access-time node.

The respective second ranges are preferably spread sufficiently evenly and finely so as to generate well-balanced loading for the plurality of interim-fast-access-time nodes.

Preferably, each of the plurality of interim-fast-access-time nodes are at an equal hierarchical level.

The respective second ranges of the LBAs preferably do not overlap.

The plurality of interim-fast-access-time nodes preferably includes a first and a second interim-fast-access-time node, and at least some of the respective second ranges of the LBAs of the first and the second interim-fast-access-time nodes alternatively include overlapping LBAs, so that one of the first and the second interim-fast-access-time nodes is operative as a redundant interim-fast-access-time node.

Preferably, the one or more slow-access-time-mass-storage nodes include a multiplicity of slow-access-time-mass-storage nodes and the respective first ranges are spread sufficiently evenly and finely so as to generate well-balanced loading for the multiplicity.

Further preferably, the plurality of interim-fast-access-time nodes includes a first interim-fast-access-time node and a second interim-fast-access-time node, and the first and second interim-fast-access-time nodes have substantially equal capacities. Alternatively, the first and second interim-fast-access-time nodes have different capacities.

Preferably, the plurality of interim-fast-access-time nodes includes a first interim-fast-access-time node and a second interim-fast-access-time node, and the one or more slow-access-time-mass-storage nodes include a first slow-access-time-mass-storage node which is coupled to only receive data from and provide data to the first interim-fast-access-time node and a second slow-access-time-mass-storage node which is coupled to only receive data from and provide data to the second interim-fast-access-time node. Alternatively, the one or more slow-access-time-mass-storage nodes include a first slow-access-time-mass-storage node and a second slow-access-time-mass-storage node which are coupled to receive data from and provide data to the first and the second interim-fast-access-time nodes.

There is further provided, according to a preferred embodiment of the present invention, a method for storing data, including:

storing the data in one or more slow-access-time-mass-storage nodes having respective first ranges of logical block addresses (LBAs);

assigning to each of a plurality of interim-fast-access-time nodes, configured to operate independently of one another, a respective second range of the LBAs;

coupling the plurality of interim-fast-access-time nodes to receive data from and provide data to the one or more slow-access-time-mass-storage nodes having LBAs within the respective second range;

receiving input/output (IO) requests from host processors directed to specified LBAs; and directing all the IO requests to the interim-fast-access-time node to which the specified LBAs are assigned.

There is further provided, according to a preferred embodiment of the present invention, a system for transferring data to and from one or more slow-access-time-mass-storage nodes which store data at respective first ranges of logical block addresses (LBAs), comprising:

a plurality of interim-fast-access-time nodes, configured to operate independently of one another, each interim-fast-access-time node being assigned a respective second range of the LBAs and coupled to receive data from and provide data to the one or more slow-access-time-mass-storage nodes within the respective second range; and one or more interface nodes, which are adapted to receive input/output (IO) requests from host processors directed to specified LBAs and to direct all the IO requests to the interim-fast-access-time node to which the specified LBAs are assigned.

There is further provided, according to a preferred embodiment of the present invention, a method for transferring data to and from one or more slow-access-time-mass-storage nodes which store data at respective first ranges of logical block addresses (LBAs), including:

assigning to a plurality of interim-fast-access-time nodes, configured to operate independently of one another, respective second ranges of the LBAs;

coupling the plurality of interim-fast-access-time nodes to receive data from and provide data to the one or more slow-access-time-mass-storage nodes having LBAs within the respective second ranges;

receiving input/output (IO) requests from host processors directed to specified LBAs; and directing all the IO requests to the interim-fast-access-time node to which the specified LBAs are assigned.

The present invention will be more fully understood from the following detailed description of the preferred embodiments thereof, taken together with the drawings, a brief description of which is given below.

DETAILED DESCRIPTION OF PREFERRED EMBODIMENTS

Figure 1:
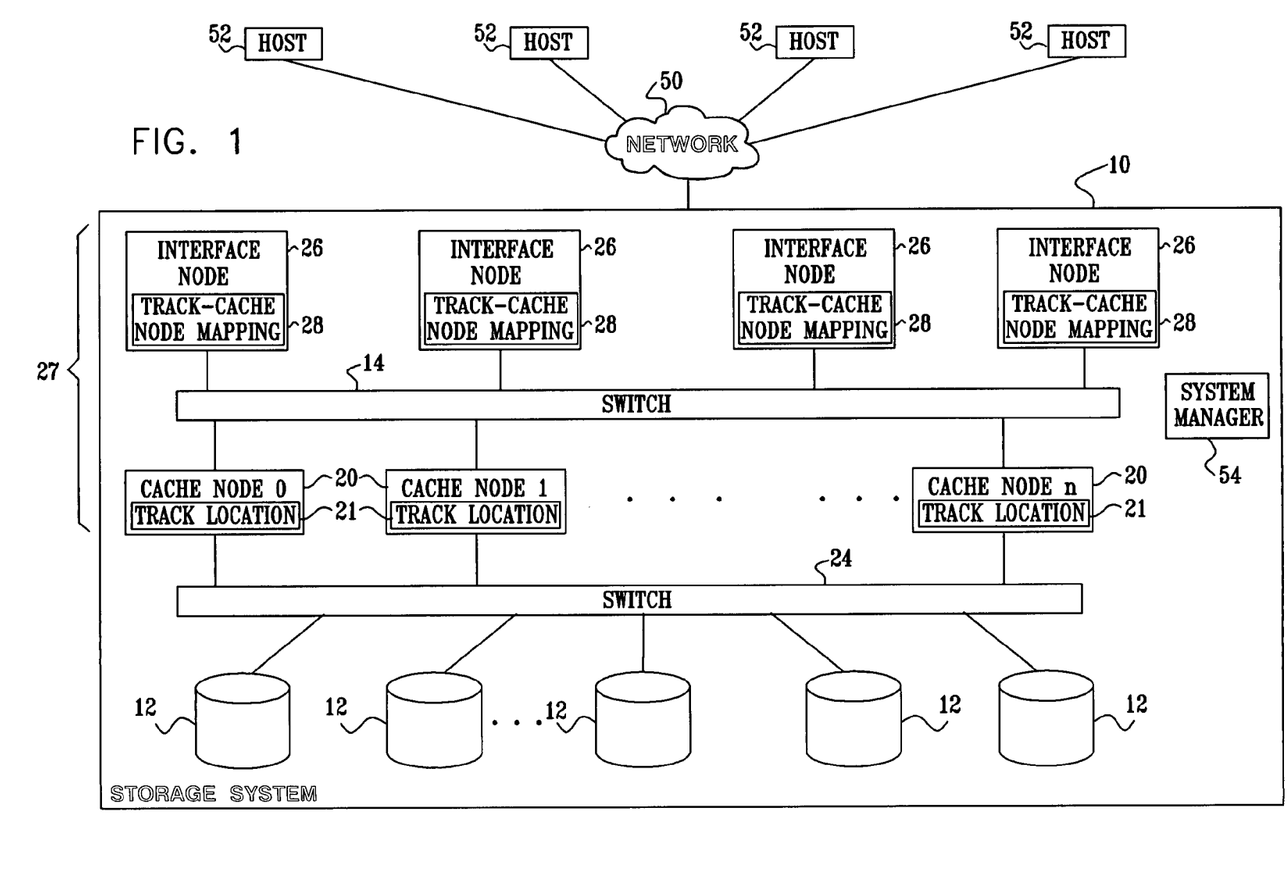
FIG. 1 is a schematic block diagram of a data storage system, according to a preferred embodiment of the present invention.

Reference is now made to FIG. 1, which is a schematic block diagram of a storage system 10, according to a preferred embodiment of the present invention. System 10 acts as a data memory for one or more host processors 52, which are coupled to the storage system by any means known in the art, for example, via a network such as the Internet or by a bus. Herein, by way of example, hosts 52 and system 10 are assumed to be coupled by a network 50. The data stored within system 10 is stored at logical block addresses (LBAs) in one or more slow access time mass storage nodes, hereinbelow assumed to be one or more disks 12, by way of example. LBAs for system 10 are preferably grouped into logical units (LUNs) and both LBAs and LUNs are allocated by a system manager 54, which also acts as central control unit for the system.

System 10 comprises one or more substantially similar interface nodes 26 which receive input/output (IO) access requests for data in disks 12 from hosts 52. Each interface node 26 may be implemented in hardware and/or software, and may be located in storage system 10 or alternatively in any other suitable location, such as an element of network 50 or one of host processors 52. Between disks 12 and the interface nodes are a second plurality of interim cache nodes 20, each cache node comprising memory having fast access time, and each cache node being at an equal level hierarchically. Each cache node 20 typically comprises random access memory (RAM), such as dynamic RAM, and may also comprise software. Cache nodes 20 are coupled to interface nodes 26 by any suitable fast coupling system known in the art, such as a bus or a switch, so that each interface node is able to communicate with, and transfer data to and from, any cache node. Herein the coupling between cache nodes 20 and interface nodes 26 is assumed, by way of example, to be by a first cross-point switch 14. Interface nodes 26 operate substantially independently of each other. Cache nodes 20 and interface nodes 26 operate as a data transfer system 27, transferring data between hosts 52 and disks 12.

Cache nodes 20 are most preferably coupled to disks 12 by a fast coupling system. The coupling between the cache nodes and the disks may be by a "second plurality of caches to first plurality of disks" coupling, herein termed an "all-to-all" coupling, such as a second cross-point switch 24. Alternatively, one or more subsets of the cache nodes may be coupled to one or more subsets of the disks. Further alternatively, the coupling may be by a "one-cache-to-one-disk" coupling, herein termed a "one-to-one" coupling, so that one cache node communicates with one disk. The coupling may also be configured as a combination of any of these types of coupling. Disks 12 operate substantially independently of each other.

At setup of system 10 system manager 54 assigns a range of LBAs to each cache node 20. Manager 54 may subsequently reassign the ranges during operation of system. and an example of steps to be taken in the event of a node change is described below with reference to FIG. 6. The ranges are chosen so that the complete memory address space of disks 12 is covered, and so that each LBA is mapped to at least one cache node; typically more than one is used for redundancy purposes. The LBAs are preferably grouped by an internal unit termed a "track," which is a group of sequential LBAS, and which is described in more detail below. The assigned ranges for each cache node 20 are preferably stored in each interface node 26 as a substantially similar table, and the table is used by the interface nodes in routing IO requests from hosts 52 to the cache nodes. Alternatively or additionally, the assigned ranges for each cache node 20 are stored in each interface node 26 as a substantially similar function, or by any other suitable method known in the art for generating a correspondence between ranges and cache nodes. Hereinbelow, the correspondence between cache nodes and ranges, in terms of tracks, is referred to as track-cache node mapping 28, and it will be understood that mapping 28 gives each interface node 26 a general overview of the complete cache address space of system 10.

In arrangements of system 10 comprising an all-to-all configuration, each cache node 20 contains a track location table 21 specific to the cache node. Each track location table 21 gives its respective cache node exact location details, on disks 12, for tracks of the range assigned to the cache node. Track location table 21 may be implemented as software, hardware, or a combination of software and hardware. The operations of track location table 21, and also of mapping 28, are explained in more detail below.

Figure 2:
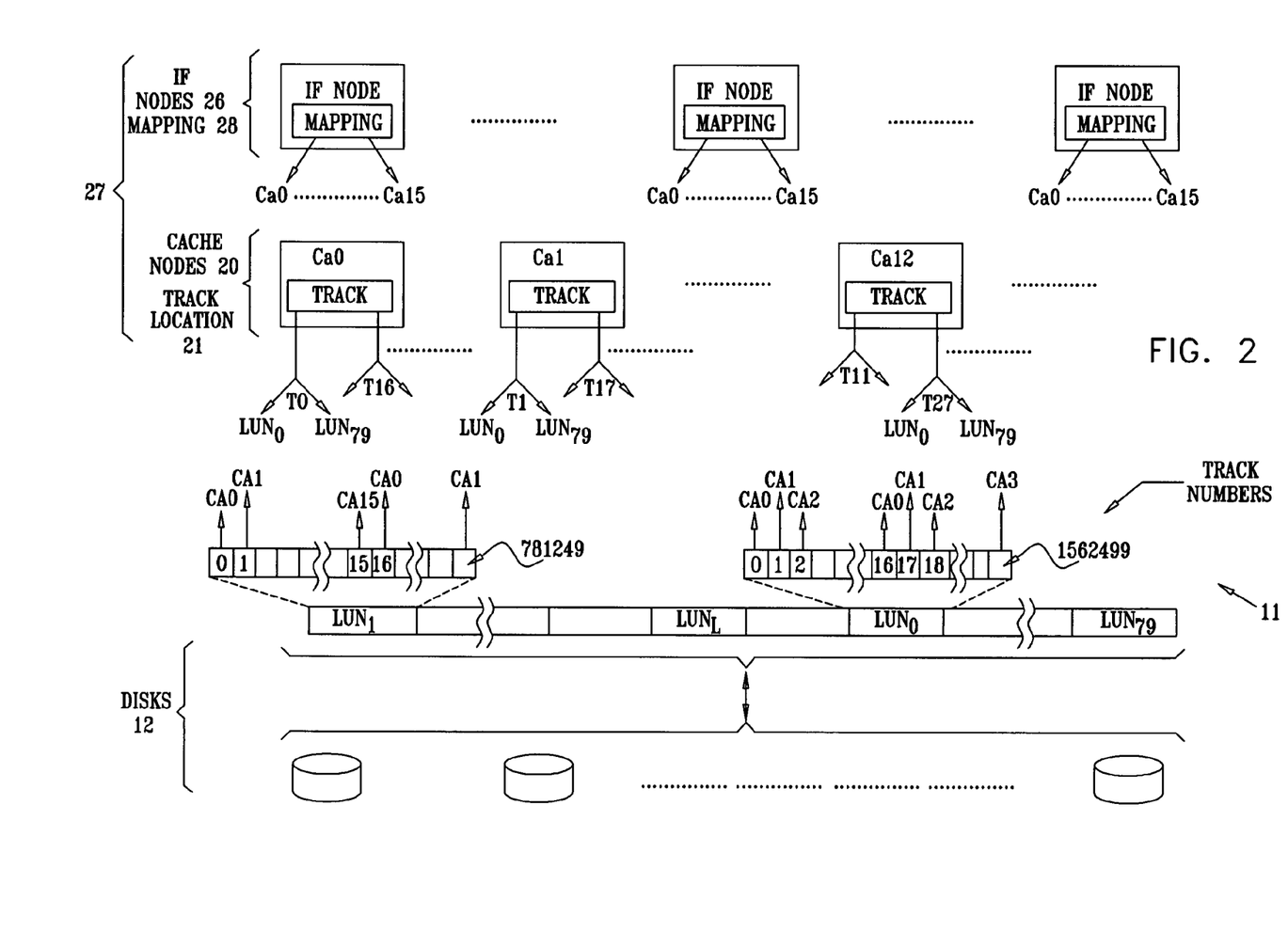
FIG. 2 is a schematic diagram illustrating a mapping of data between different nodes of the system of FIG. 1 for an "all-caches-to-all-disks" configuration, according to a preferred embodiment of the present invention.

FIG. 2 is a schematic diagram illustrating a mapping of data between different nodes of system 10 when the system comprises an all-to-all configuration 11, according to a preferred embodiment of the present invention. It will be appreciated that host processors 52 may communicate with storage system 10 using virtually any communication system known in the art. By way of example, hereinbelow it is assumed that the hosts communicate with system 10, via network 50, according to an Internet Small Computer System Interface (iSCSI) protocol, wherein blocks of size 512 bytes are transferred between the hosts and the system. The internal unit of data, i.e., the track, is defined by system manager 54 for system 10, and is herein assumed to have a size of 128 iSCSI blocks, i.e., 64 KB, although it will be appreciated that substantially any other convenient size of track may be used to group the data.

Also by way of example, system 10 is assumed to comprise 16 cache nodes 20, herein termed Ca0, Ca1, . . . , Ca14, Ca15, and 32 generally similar disks 12, each disk having a 250 GB storage capacity, for a total disk storage of 8 TB. It will be understood that there is no requirement that disks 12 have equal capacities, and that the capacities of disks 12 have substantially no effect on the performance of cache nodes 20. The 32 disks are assumed to be partitioned into generally similar LUNs, $LUN_L$, where L is an identifying LUN integer from 0 to 79. The LUNs include $LUN_0$ having a capacity of 100 GB. Each LUN is sub-divided into tracks, so that $LUN_0$ comprises $$\frac{100 \, GB}{64 \, KB}$$

tracks i.e., 1,562,500 tracks, herein termed Tr0, Tr,1, ..., Tr1562498, Tr1562499. (Typically, as is described further below, the LBAs for any particular LUN may be spread over a number of disks 12, to achieve well-balanced loading for the disks.)

In system 10, each track of $LUN_0$ is assigned to a cache node according to the following general mapping:

$$Tr(n) \rightarrow Ca(n \bmod 16) \quad (1)$$

where n is the track number.

Mapping (1) generates the following specific mappings between tracks and cache nodes:

$$
\begin{array}{rcl}
Tr(0) & \longrightarrow & Ca(0) \\
Tr(1) & \longrightarrow & Ca(1) \\
& M & \\
Tr(15) & \longrightarrow & Ca(15) \\
Tr(16) & \longrightarrow & Ca(0) \\
Tr(17) & \longrightarrow & Ca(1) \\
& M & \\
Tr(1562498) & \longrightarrow & Ca(2) \\
Tr(1562499) & \longrightarrow & Ca(3) \\
\end{array}
\quad (2)
$$

A similar mapping for each LUN comprising disks 12 may be generated. For example, a $LUN_1$ having a capacity of 50 GB is sub-divided into 781,250 tracks, and each track of $LUN_1$ is assigned the following specific mappings:

$$
\begin{array}{rcl}
Tr(0) & \longrightarrow & Ca(0) \\
Tr(1) & \longrightarrow & Ca(1) \\
& M & \\
Tr(15) & \longrightarrow & Ca(15) \\
Tr(16) & \longrightarrow & Ca(0) \\
Tr(17) & \longrightarrow & Ca(1) \\
& M & \\
Tr(781248) & \longrightarrow & Ca(0) \\
Tr(781249) & \longrightarrow & Ca(1) \\
\end{array}
\quad (3)
$$

Inspection of mappings (2) and (3) shows that the tracks of $LUN_0$ and of $LUN_1$ are substantially evenly mapped to cache nodes 20. In general, for any $LUN_L$, a general mapping for every track in disks 12 is given by:

$$Tr(L,n) \rightarrow Ca(n \bmod 16) \quad (4)$$

where n is the track number of $LUN_L$.

It will be appreciated that mapping (4) is substantially equivalent to a look-up table, such as Table I below, that assigns specific tracks to specific cache nodes, and that such a look-up table may be stored in each interface node in place of the mapping.

TABLE I

| L (LUN identifier) | n (Track number) | Cache Node (0-15) |
|---|---|---|
| 0 | 0 | 0 |
| 0 | 1 | 1 |
| 0 | 2 | 2 |
| 0 | 3 | 3 |
| 0 | 4 | 4 |
| ... | ... | ... |
| 0 | 15 | 15 |
| 0 | 16 | 0 |
| ... | ... | ... |
| 0 | 1562498 | 2 |
| 0 | 1562499 | 3 |
| 1 | 0 | 0 |
| 1 | 1 | 1 |
| ... | ... | ... |
| 1 | 17 | 1 |
| ... | ... | ... |
| 1 | 781249 | 1 |
| ... | ... | ... |

Mapping (4) and Table I are examples of correspondences that assign each track comprised in disks 12 to a specific cache node. Other examples of such assignment will be apparent to those skilled in the art. While such assignments may always be defined in terms of a look-up table such as Table I, it will be appreciated that any particular assignment may not be defined by a simple function such as mapping (4). For example, a preferred embodiment of the present invention comprises a Table II where each track of each LUN is assigned by randomly or pseudo-randomly choosing a cache node between 0 and 15.

TABLE II

| L (LUN identifier) | n (Track number) | Cache Node (0-15) |
|---|---|---|
| 0 | 0 | 11 |
| 0 | 1 | 0 |
| ... | ... | ... |
| 0 | 15 | 12 |
| 0 | 16 | 2 |
| ... | ... | ... |
| 0 | 1562498 | 14 |
| 0 | 1562499 | 13 |
| 1 | 0 | 7 |
| 1 | 1 | 5 |
| ... | ... | ... |
| 1 | 17 | 12 |
| ... | ... | ... |
| 1 | 781249 | 15 |
| ... | ... | ... |

Configurations of system 10 that include an all-to-all configuration such as configuration 11 include track location table 21 in each cache node 20 of the all-to-all configuration. Track location table 21 is used by the cache node to determine an exact disk location of a requested LUN and track. Table III below is an example of track location table 21 for cache node Ca7, assuming that mapping 28 corresponds to Table I. In Table III, the values a, b, ..., f, ... of the disk locations of the tracks, are allocated by system manager 54.

TABLE III

Cache Node Ca7

| | Track | |
|---|---|---|
| L (Lun identifier) | n (Track number) | Disk Location |
| 0 | 7 | a |
| 0 | 23 | b |
| ... | ... | ... |
| 0 | 1562487 | c |
| 1 | 7 | d |
| 1 | 23 | e |
| ... | ... | ... |
| 1 | 1562487 | f |
| ... | ... | ... |

Figure 3:
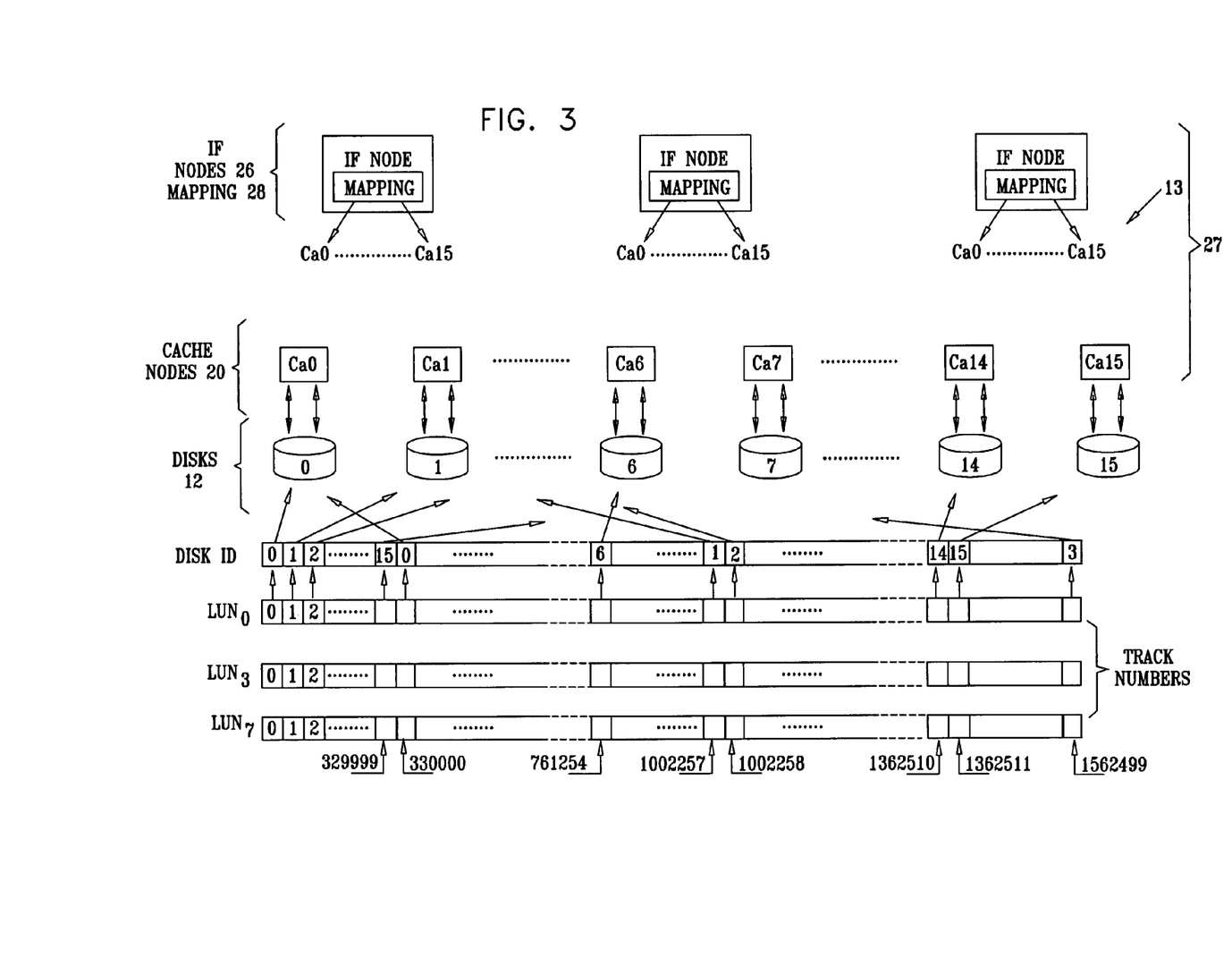
FIG. 3 is a schematic diagram illustrating a mapping of data between different nodes of system of FIG. 1 for a "one-cache-to-one-disk" configuration, according to a preferred embodiment of the present invention.

FIG. 3 is a schematic diagram illustrating a mapping of data between different nodes of system 10 when the system comprises a one-to-one configuration 13, according to a preferred embodiment of the present invention. In one-to-one configuration 13, tracks are assigned to cache nodes on the basis of the disks wherein the tracks originate. FIG. 3, and Table IV below, shows an example of tracks so assigned. For the assignment of each track of system 10 defined by Table IV, there are assumed to be 16 generally similar disks 12, each disk having a whole number disk identifier D ranging from 0 to 15 and 50 GB capacity, and each disk is assigned a cache node. There are also assumed to be 8 LUNs $LUN_L$, where L is an integer from 0 to 7, of 100 GB evenly divided between the disks, according to mapping (5):

$$Tr(L,n) \to Disk(n \bmod 16) = Ca(n \bmod 16) \quad (5)$$

TABLE IV

| | Track | | |
|---|---|---|---|
| L (LUN identifier) | n (Track number) | D (Disk identifier) (0-15) | Cache Node (0-15) |
| 0-7 | 0 | 0 | 0 |
| | 1 | 1 | 1 |
| | 2 | 2 | 2 |
| | ... | ... | ... |
| | 329999 | 15 | 15 |
| | 330000 | 0 | 0 |
| | ... | ... | ... |
| | 761254 | 6 | 6 |
| | ... | ... | ... |
| | 1002257 | 1 | 1 |
| | 1002258 | 2 | 2 |
| | ... | ... | ... |
| | 1562499 | 3 | 3 |

A mapping such as mapping (4) or mapping (5), or a table such as Table I, II, or IV, or a combination of such types of mapping and tables, is incorporated into each interface node 26 as its track-cache node mapping 28, and spreads the LBAs of the LUNs substantially evenly across cache nodes 20. The mapping used is a function of the coupling arrangement between cache nodes 20 and disks 12. Track-cache node mapping 28 is used by the interface nodes to process IO requests from hosts 52, as is explained with respect to FIG. 5 below. The application titled "Data Allocation in a Distributed Storage System," describes a system for mapping LBAs to devices such as cache nodes 20 and/or disks 12, and such a system is preferably used for generating track-cache node mapping 28.

To achieve well-balanced loading across cache nodes 20, system 10 generates even and sufficiently fine "spreading" of all the LBAs over the cache nodes, and it will be appreciated that track-cache node mapping 28 enables system 10 to implement the even and fine spread, and thus the well-balanced loading. For example, if in all-to-all configuration 11, or in one-to-one configuration 13, cache nodes 20 comprise substantially equal capacities, it will be apparent that well-balanced loading occurs. Thus, referring back to mapping (1), statistical considerations make it clear that the average IO transaction related with the LBAs of $LUN_0$ is likely to use evenly all the 16 cache nodes available in the system, rather than anyone of them, or any subset of them, in particular. This is because $LUN_0$ contains about 1.5 million tracks, and these tracks are now spread uniformly and finely across all 16 cache nodes, thus yielding a well-balanced load for the IO activity pertaining to the caches, as may be true in general for any system where the number of tracks is far greater than the number of nodes. Similarly, spreading LBAs evenly and sufficiently finely amongst disks 12 leads to well-balanced IO activity for the disks.

An example of a configuration with unequal cache capacities is described with reference to FIG. 4.

Figure 4:
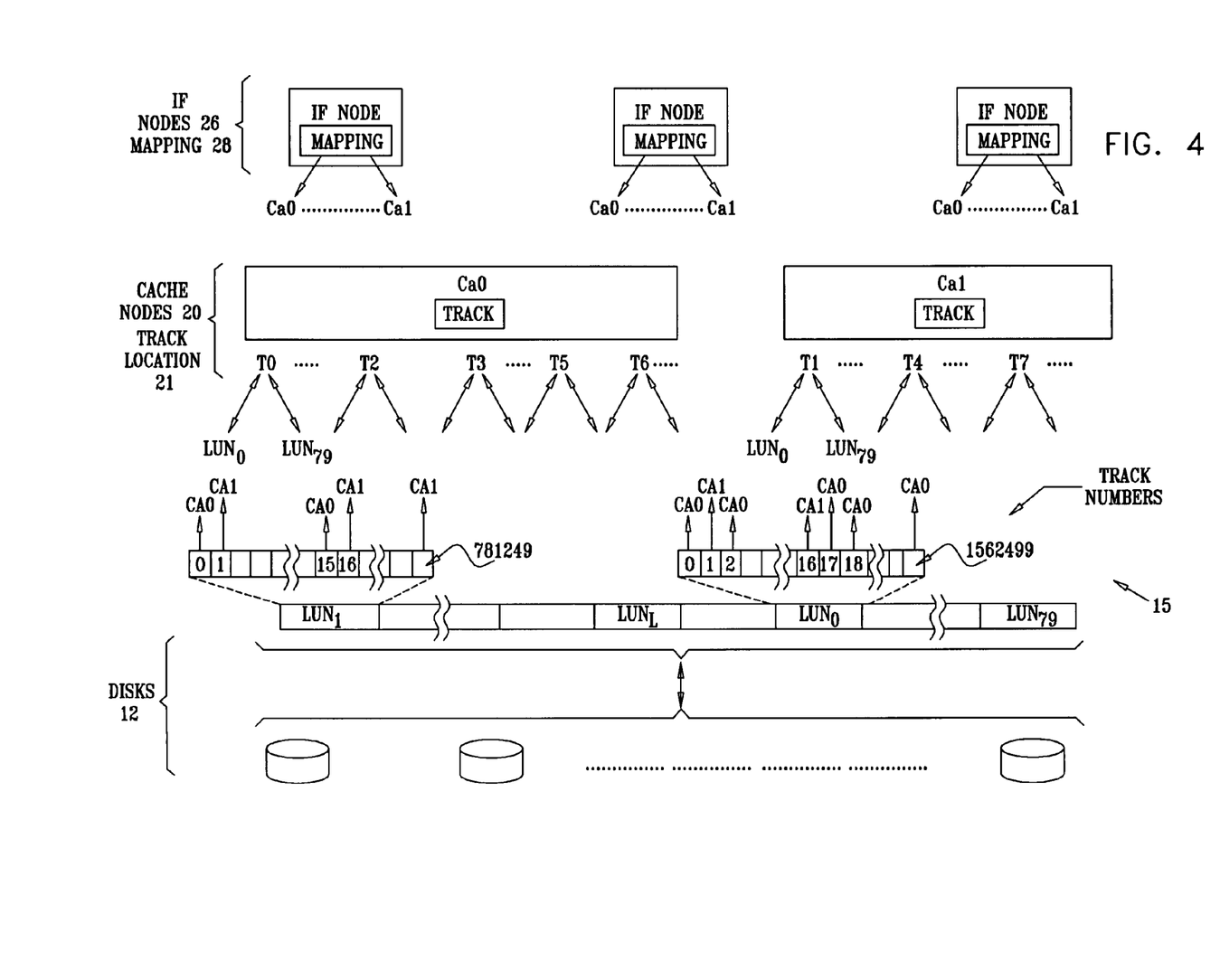
FIG. 4 is a schematic diagram illustrating a mapping of data between different nodes of the system of FIG. 1 for an alternative "all-caches-to-all-disks" configuration, according to a preferred embodiment of the present invention.

FIG. 4 is a schematic diagram illustrating a mapping of data between different nodes of system 10 when the system comprises an alternative all-to-all configuration 15, according to a preferred embodiment of the present invention. Apart from the differences described below, configuration 15 is generally similar to configuration 11, so that elements indicated by the same reference numerals in both configurations are generally identical in construction and in operation. All-to-all configuration 15 comprises two cache nodes 20, herein termed Ca0 and Ca1, Ca0 having approximately twice the capacity of Ca1.

Track-cache node mapping 28 is implemented as mapping (6) below, or as Table V below, which is derived from mapping (6).

$$Tr(L,n) \to Ca[(n \bmod 3) \bmod 2] \quad (6)$$

where n is the track number of $LUN_L$.

TABLE V

| | Track | |
|---|---|---|
| L (LUN identifier) | n (Track number) | Cache Node (0-1) |
| 0 | 0 | 0 |
| 0 | 1 | 1 |
| 0 | 2 | 0 |
| 0 | 3 | 1 |
| 0 | 4 | 1 |
| 0 | 5 | 0 |
| 0 | 6 | 0 |
| ... | ... | ... |
| 0 | 15 | 0 |
| 0 | 16 | 1 |
| 0 | 17 | 0 |
| 0 | 18 | 0 |
| ... | ... | ... |
| 0 | 1562499 | 0 |
| 1 | 0 | 0 |
| 1 | 1 | 1 |
| ... | ... | ... |
| 1 | 15 | 0 |
| 1 | 16 | 1 |
| 1 | 17 | 0 |
| ... | ... | ... |
| 1 | 781249 | 1 |
| ... | ... | ... |

Mapping 28 is configured to accommodate the unequal capacities of Ca0 and Ca1 so that well-balanced loading of configuration 15 occurs.

By inspection of the exemplary mappings for configurations 11, 13, and 15, it will be appreciated that mapping 28 may be configured to accommodate cache nodes 20 in system 10 having substantially any capacities, so as to maintain substantially well-balanced loading for the system. It will also be appreciated that the loading generated by mapping 28 is substantially independent of the capacity of any specific disk in system 10, since the mapping relates cache nodes to tracks.

Figure 5:
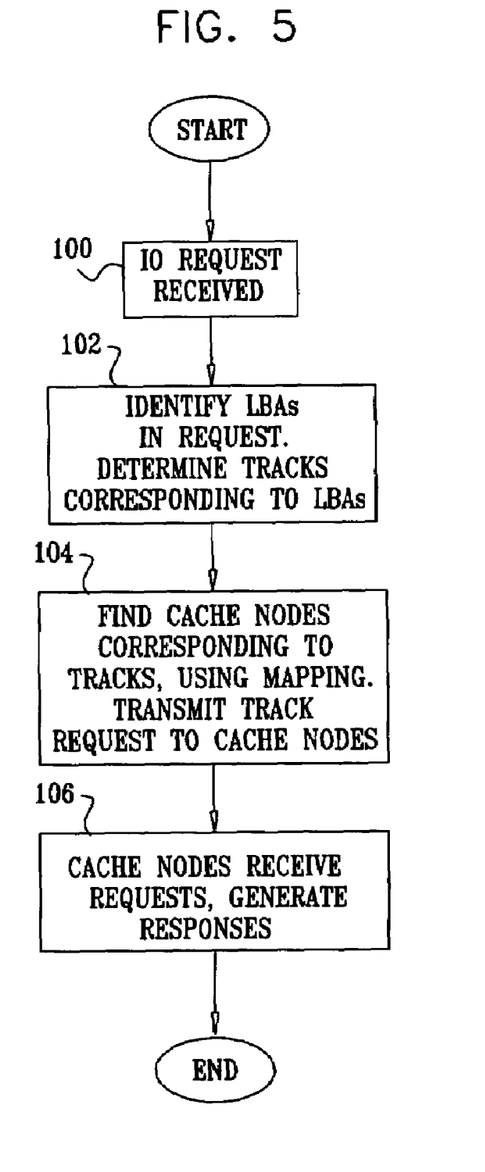
FIG. 5 is a flow chart showing steps followed by the system of FIG. 1 on receipt of an input/output request from a host communicating with the system, according to a preferred embodiment of the present invention.

FIG. 5 is a flow chart showing steps followed by system 10 on receipt of an IO request from one of hosts 52, according to a preferred embodiment of the present invention. Each IO request from a specific host 52 comprises several parameters, such as whether the request is a read or a write command, the LUN to which the request is addressed, the first LBA requested, and a number of blocks of data included in the request.

In an initial step 100, the IO request is transmitted to system 10 in one or more packets according to the protocol under which the hosts and the system are operating. The request is received by system 10 at one of interface nodes 26, herein, for clarity, termed the request-receiving interface (RRI) node.

In a track identification step 102, the RRI node identifies from the request the LBAs from which data is to be read from, or to which data is to be written to. The RRI node then determines one or more tracks corresponding to the LBAs which have been identified.

In a cache identification step 104, the RRI node refers to its mapping 28 to determine the cache nodes corresponding to tracks determined in the third step. For each track so determined, the RRI node transfers a respective track request to the cache node corresponding to the track. It will be understood that each track request is a read or a write command, according to the originating IO request.

In a cache response 106, each cache node 20 receiving a track request from the RRI node responds to the request. The response is a function of, inter alia, the type of request, i.e., whether the track request is a read or a write command and whether the request is a "hit" or a "miss." Thus, data may be written to the LBA of the track request from the cache node and/or read from the LBA to the cache node. Data may also be written to the RRI from the cache node and/or read from the RRI to the cache node. If system 10 comprises an all-to-all configuration, and the response includes writing to or reading from the LBA, the cache node uses its track location table 21 to determine the location on the corresponding disk of the track for the LBA.

The flow chart of FIG. 5 illustrates that there is virtually no management activity of system 10 once an IO request has reached a specific interface node 26. This is because the only activity performed by the node is, as described above for steps 102 and 104, identifying track requests and transmitting the track requests to their respective cache nodes 20. Similarly, each cache node 20 operates substantially independently, since once a track request reaches its cache node, data is moved between the cache node and the interface node originating the request, and between the cache node and the required disk, as necessary, to service the request.

Figure 6:
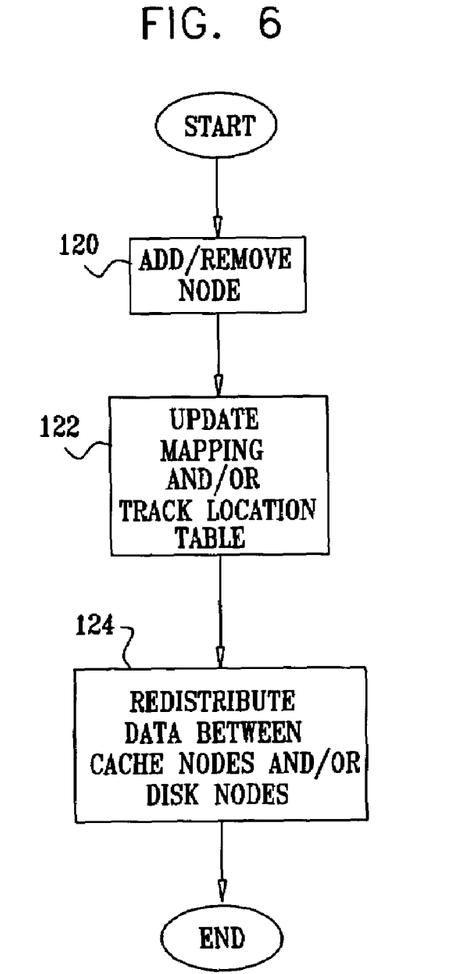
FIG. 6 is a flow chart showing steps followed by the system of FIG. 1 on addition or removal of a cache or disk node from the system, according to a preferred embodiment of the present invention.

FIG. 6 is a flow chart showing steps followed by system 10 on addition or removal of a cache or disk node from system 10, according to a preferred embodiment of the present invention. In a first step 120, a cache or disk node is added or removed from system 10. In an update step 122, system manager 54 updates mapping 28 and/or track location table 21 to reflect the change in system 10. In a redistribution step 124, system manager 54 redistributes data on disks 12, if the change has been a disk change, or data between cache nodes 20, if the change is a cache change. The redistribution is according to the updated mapping 28, and it will be understood that the number of internal IO transactions generated for the redistribution is dependent on changes effected in mapping 28. Once redistribution is complete, system 10 then proceeds to operate as described with reference to FIG. 4. It will thus be apparent that system 10 is substantially perfectly scalable.

Referring back to FIGS. 1, 2, and 3, redundancy for cache nodes 20 and/or disks 12 may be easily incorporated into system 10. The redundancy may be implemented by modifying track-cache node mapping 28 and/or track location table 21, so that data is written to more than one cache node 20, and may be read from any of the cache nodes, and also so that data is stored on more than one disk 12.

Mapping (7) below is an example of a mapping, similar to mapping (4), that assigns each track to two cache nodes 20 of the 16 cache nodes available, so that incorporating mapping (7) as track-cache node mapping 28 in each interface node 26 will form a redundant cache node for each cache node of system 10.

$$Tr(L, n) \rightarrow \begin{cases} Ca(n \bmod 8) \\ Ca(7 + n \bmod 8) \end{cases} \quad (7)$$

In processing an IO request, as described above with reference to FIG. 5, the interface node 26 that receives the IO request may generate a track request (cache identification step 104) to either cache node defined by mapping (7).

Table VI below is an example of a table for cache node Ca7, similar to Table III above, that assumes each track is written to two separate disks 12, thus incorporating disk redundancy into system 10. The specific disk locations for each track are assigned by system manager 54. A table similar to Table VI is incorporated as track location table 21 into each respective cache node 20.

TABLE VI

Cache Node Ca7

| Track | | |
|---|---|---|
| L (LUN identifier) | n (Track number) | Disk Location |
| 0 | 7 | a1, a2 |
| 0 | 23 | b1, b2 |
| ... | ... | ... |
| 0 | 1562487 | c1, c2 |
| 1 | 7 | d1, d2 |
| 1 | 23 | e1, e2 |
| ... | ... | ... |
| 1 | 1562487 | f1, f2 |
| ... | ... | ... |

As described above with reference to cache response step 106 (FIG. 5), the cache node that receives a specific track request may need to refer to track location table 21. This reference generates a read or a write, so that in the case of Table VI, the read may be to either disk assigned to the specific track, and the write is to both disks.

It will be appreciated that other forms of redundancy known in the art, apart from those described above, may be incorporated into system 10. For example, a write command to a cache node may be considered to be incomplete until the command has also been performed on another cache node. All such forms of redundancy are assumed to be comprised within the present invention.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A storage system, comprising:
   one or more slow-access-time-mass-storage nodes, coupled to store data at respective first ranges of logical block addresses (LBAs);
   a plurality of interim-fast-access-time nodes, configured to operate independently of one another, each interim-fast-access-time node being assigned a respective second range of the LBAs and coupled to receive data from and provide data to the one or more slow-access-time-mass-storage nodes having LBAs within the respective second range, all of the second ranges of LBAs comprising a total LBA range; and
   one or more interface nodes, which are adapted to receive input/output (IO) requests from host processors directed to specified LBAs and to direct all the IO requests to the interim-fast-access-time node to which the specified LBAs are assigned;
   wherein each interim-fast-access-time nodes is configured to be reassignable to a new respective second range of the LBAs, all of the new respective second ranges of LBAs comprising the total LBA range.

2. A storage system according to claim 1,
   wherein the one or more interface nodes comprise a mapping between the interim-fast-access-time nodes and the LBAs, and
   wherein the one or more interface nodes are adapted to convert the IO requests to one or more requests and to direct the one or more requests to respective one or more interim-fast-access-time nodes in response to the mapping.

3. A storage system according to claim 2, wherein the mapping comprises a function relating each specific interim-fast-access-time node of the plurality of interim-fast-access-time nodes to the respective second range of the LBAs.

4. A storage system according to claim 2, wherein the mapping comprises a table relating each specific interim-fast-access-time node of the plurality of interim-fast-access-time nodes to the respective second range of the LBAs.

5. A storage system according to claim 2,
   wherein the data is allocated into groups of data within the one or more slow-access-time-mass-storage nodes according to a pre-defined unit of the storage system comprising an integral number of bytes of the data, and
   wherein the mapping comprises a correspondence between the interim-fast-access-time nodes and the groups of data.

6. A storage system according to claim 1, wherein the one or more slow-access-time-mass-storage nodes comprise one or more disks, and wherein the interim-fast-access-time nodes comprise random access memories.

7. A storage system according to claim 1, wherein the plurality of interim-fast-access-time nodes comprise respective location tables, wherein each location table comprises locations of the second range of the LBAs assigned to the respective interim-fast-access-time node.

8. A storage system according to claim 1, wherein the respective second ranges are spread sufficiently evenly and finely so as to generate well-balanced loading for the plurality of interim-fast-access-time nodes.

9. A storage system according to claim 1, wherein each of the plurality of interim-fast-access-time nodes are at an equal hierarchical level.

10. A storage system according to claim 1, wherein the respective second ranges of the LBAs do not overlap.

11. A storage system according to claim 1, wherein the one or more slow-access-time-mass-storage nodes comprise a multiplicity of slow-access-time-mass-storage nodes and the respective first ranges are spread sufficiently evenly and finely so as to generate well-balanced loading for the multiplicity.

12. A storage system according to claim 1,
    wherein the plurality of interim-fast-access-time nodes comprises a first interim-fast-access-time node and a second interim-fast-access-time node, and
    wherein the first and second interim-fast-access-time nodes have substantially equal capacities.

13. A storage system according to claim 1,
    wherein the plurality of interim-fast-access-time nodes comprises a first interim-fast-access-time node and a second interim-fast-access-time node, and
    wherein the first and second interim-fast-access-time nodes have different capacities.

14. A storage system according to claim 1,
    wherein the plurality of interim-fast-access-time nodes comprises a first interim-fast-access-time node and a second interim-fast-access-time node, and
    wherein the one or more slow-access-time-mass-storage nodes comprise a first slow-access-time-mass-storage node which is coupled to only receive data from and provide data to the first interim-fast-access-time node and a second slow-access-time-mass-storage node which is coupled to only receive data from and provide data to the second interim-fast-access-time node.

15. A storage system according to claim 1,
    wherein the plurality of interim-fast-access-time nodes comprises a first interim-fast-access-time node and a second interim-fast-access-time node, and
    wherein the one or more slow-access-time-mass-storage nodes comprise a first slow-access-time-mass-storage node and a second slow-access-time-mass-storage node which are coupled to receive data from and provide data to the first and the second interim-fast-access-time nodes.

16. A storage system according to claim 1, wherein the interim-fast-access-time nodes are configured to be reassigned by a management node.

17. A storage system according to claim 1, wherein the interim-fast-access-time nodes are configured to be reassigned based on a removal of at least one of the plurality of interim-fast-access-time nodes or one of the plurality of slow-access-time-mass-storage nodes.

18. A storage system according to claim 1, wherein the interim-fast-access-line nodes are configured to be reassigned based on rebalancing a load between at least one of the plurality of interim-fast-access-time nodes or one of the plurality of slow-access-time-mass-storage nodes.

19. A storage system, comprising:
one or more slow-access-time-mass-storage nodes, coupled to store data at respective first ranges of logical block addresses (LBAs);
a plurality of interim-fast-access-time nodes, configured to operate independently of one another, each interim-fast-access-time node being assigned a respective second range of LBAs and coupled to receive data from and provide data to the one or more slow-access-time-mass-storage nodes having LBAs within the respective second range; and
one or more interface nodes, which are adapted to receive input/output (IO) requests from host processors directed to specified LBAs and to direct all the IO requests to the interim-fast-access-time node to which the specified LBAs are assigned;
wherein the plurality of interim-fast-access-time nodes comprise a first and a second interim-fast-access-time node, and
wherein at least some of the respective second ranges of the LBAs of the first and the second interim-fast-access-time nodes comprise overlapping LBAs, so that one of the first and the second interim-fast-access-time nodes is operative as a redundant interim-fast-access-time node.

20. A method for storing data, comprising:
storing the data in one or more slow-access-time-mass-storage nodes having respective first ranges of logical block addresses (LBAs);
assigning to each of a plurality of interim-fast-access-time nodes, configured to operate independently or one another, a respective second range of the LBAs, all of the second ranges of LBAs comprising a total LBA range;
coupling the plurality of interim-fast-access-time nodes to receive data from and provide data to the one or more slow-access-time-mass-storage nodes having LBAs within the respective second range;
receiving input/output (IO) requests from host processors directed to specified LBAs; and
directing all the IO requests to the interim-fast-access-time node to which the specified LBAs are assigned;
wherein the interim-fast-access-time nodes are configured to be reassignable to a new respective second range of the LBAs, all of the new respective second ranges of LBAs comprising the total LBA range.

21. A method according to claim 20, wherein the IO requests are directed to one or more interface nodes, wherein the one or more interface nodes comprise a mapping between the interim-fast-access-time nodes and the LBAs, and wherein the one or more interface nodes are adapted to convert the IO requests to one or more LBA requests and to direct the one or more LBA requests to respective one or more interim-fast-access-time nodes in response to the mapping.

22. A method according to claim 21, wherein the mapping comprises a function relating each specific interim-fast-access-time node of the plurality of interim-fast-access-time nodes to the respective second range of the LBAs.

23. A method according to claim 21, wherein the mapping comprises a table relating each specific interim-fast-access-time node of the plurality of interim-fast-access-time nodes to the respective second range of the LBAs.

24. A method according to claim 21, wherein the data is allocated into groups of data within the one or more slow-access-time-mass-storage nodes according to a pre-defined unit comprising an integral number of bytes of the data, and wherein the mapping comprises a correspondence between the interim-fast-access-time nodes and the groups of data.

25. A method according to claim 20, wherein the one or more slow-access-time-mass-storage nodes comprise one or more disks, and wherein the interim-fast-access-time nodes comprise random access memories.

26. A method according to claim 20, wherein the plurality of interim-fast-access-time nodes comprise respective location tables, wherein each location table comprises locations of the second range of die LBAs assigned to the respective interim-fast-access-time node.

27. A method according to claim 20, wherein the respective second ranges are spread sufficiently evenly and finely so as to generate well-balanced loading for the plurality of interim-fast-access-time nodes.

28. A method according to claim 20, wherein each of the plurality of interim-fast-access-time nodes are at an equal hierarchical level.

29. A method according to claim 20, wherein the respective second ranges of the LBAs do not overlap.

30. A method according to claim 20, wherein the one or more slow-access-time-mass-storage nodes comprise a multiplicity of slow-access-time-mass-storage nodes and the respective first ranges are spread sufficiently evenly and finely so as to generate well-balanced loading for the multiplicity.

31. A method according to claim 20, wherein the plurality of interim-fast-access-time nodes comprises a first interim-fast-access-time node and a second interim-fast-access-time node, and wherein the first and second interim-fast-access-time nodes have substantially equal capacities.

32. A method according to claim 20, wherein the plurality of interim-fast-access-time nodes comprises a first interim-fast-access-dine node and a second interim-fast-access-time node, and wherein the first and second interim-fast-access-time nodes have different capacities.

33. A method according to claim 20, wherein the plurality of interim-fast-access-time nodes comprises a first interim-fast-access-time node and a second interim-fast-access-time node, and wherein the one or more slow-access-time-mass-storage nodes comprise a first slow-access-time-mass-storage node which is coupled to only receive data from and provide data to the first interim-fast-access-time node and a second slow-access-time-mass-storage node which is coupled to only receive data from and provide data to the second interim-fast-access-time node.

34. A method according to claim 20, wherein the plurality of interim-fast-access-time nodes comprises a first interim-fast-access-time node and a second interim-fast-access-time node, and wherein the one or more slow-access-time-mass-storage nodes comprise a first slow-access-time-mass-storage node and a second slow-access-time-mass-storage node which are coupled to receive data from and provide data to the first and the second interim-fast-access-time nodes.

35. A method for storing data, comprising:
storing the data in one or more slow-access-time-mass-storage nodes having respective first ranges of logical block addresses (LBAs), all of the first ranges of LBAS comprising a total LBA range;
assigning to each of a plurality of interim-fast-access-time nodes, configured to operate independently of one another, a respective second range of the LBAs, all of the second ranges of LBAs comprising the total LBA range;
coupling the plurality of interim-fast-access-time nodes to receive data from and provide data to the one or more slow-access-time-mass-storage nodes having LBAs within the respective second range;

receiving input/output (IO) requests from host processors directed to specified LBAs; and directing all the IO requests to the interim-fast-access-time node to which the specified LBAs are assigned;

wherein the plurality of interim-fast-access-time nodes comprise a first and a second interim-fast-access-time node, and wherein at least some of the respective second ranges of the LBAs of the first and the second interim-fast-access-time nodes comprise overlapping LBAs, so that one of the first and second interim-fast-access-time nodes is operative as a redundant interim-fast-access-time node.

36. A system for transferring data to and from one or more slow-access-time-mass-storage nodes which store data at respective first ranges of logical block addresses (LBAs), comprising:

a plurality of interim-fast-access-time nodes, configured to operate independently of one another, each interim-fast-access-time node being assigned a respective second range of the LBAs and coupled to receive data from and provide data to the one or more slow-access-time-mass-storage nodes within the respective second range, all of the second ranges of LBAs comprising a total LBA range; and one or more interface nodes, which are adapted to receive input/output (IO) requests from host processors directed to specified LBAs and to direct all the IO requests to the interim-fast-access-time node to which the specified LBAs are assigned;

wherein the interim-fast-access-time nodes are configured to be reassignable to a new respective second range of the LBAs, all of the new respective second ranges of LBAs comprising the total LBA range.

37. A system according to claim 36, wherein the one or more interface nodes comprise a mapping between the interim-fast-access-time nodes and the LBAs, and wherein the one or more interface nodes are adapted to convert the IO requests to one or more requests and to direct the one or more requests to respective one or more interim-fast-access-time nodes in response to the mapping.

38. A system according to claim 37, wherein the mapping comprises a function relating each specific interim-fast-access-time node of the plurality of interim-fast-access-time nodes to the respective second range of the LBAS.

39. A system according to claim 37, wherein the mapping comprises a table relating each specific interim-fast-access-time node of the plurality of interim-fast-access-time nodes to the respective second range of the LBAs.

40. A system according to claim 37, wherein the data is allocated into groups of data within the one or more slow-access-time-mass-storage nodes according to a pre-defined unit of the storage system comprising an integral number of bytes of the data, and wherein the mapping comprises a correspondence between the interim-fast-access-time nodes and the groups of data.

41. A system according to claim 36, wherein the one or more slow access time-mass-storage nodes comprise one or more disks, and wherein the interim-fast-access-time nodes comprise random access memories.

42. A system according to claim 36, wherein the plurality of interim-fast-access-time nodes comprise respective location tables, wherein each location table comprises locations of the second range of the LBAs assigned to the respective interim-fast-access-time node.

43. A system according to claim 36, wherein the respective second ranges are spread sufficiently evenly and finely so as to generate well-balanced loading for the plurality of interim-fast-access-time nodes.

44. A system according to claim 36, wherein each of the plurality of interim-fast-access-time nodes are at an equal hierarchical level.

45. A system according to claim 36, wherein the respective second ranges of the LBAs do not overlap.

46. A system according to claim 36, wherein the plurality of interim-fast-access-time nodes comprises a first interim-fast-access-time node and a second interim-fast-access-time node, and wherein the first and second interim-fast-access-time nodes have substantially equal capacities.

47. A system according to claim 36, wherein the plurality of interim-fast-access-time nodes comprises a first interim-fast-access-time node and a second interim-fast-access-time node, and wherein the first and second interim-fast-access-time nodes have different capacities.

48. A system according to claim 36, wherein the plurality of interim-fast-access-time nodes comprises a first interim-fast-access-time node and a second interim-fast-access-time node, and wherein the one or more slow-access-time-mass-storage nodes comprise a first slow-access-line-mass-storage node which is coupled to only receive data from and provide data to the first interim-fast-access-time node and a second slow-access-time-mass-storage node which is coupled to only receive data from and provide data to the second interim-fast-access-time node.

49. A system according to claim 36, wherein the plurality of interim-fast-access-time nodes comprises a first interim-fast-access-time node and a second interim-fast-access-time node, and wherein the one or more slow-access-time-mass-storage nodes comprise a first slow-access-time-mass-storage node and a second slow-access-time-mass-storage node which are coupled to receive data from and provide data to the first and the second interim-fast-access-time nodes.

50. A system for transferring data to and from one or more slow-access-time-mass-storage nodes which store data at respective first ranges of logical block addresses (LBAs), comprising:

a plurality of interim-fast-access-time nodes, configured to operate independently of one another, each interim-fast-access-time node being assigned a respective second range of LBAs and coupled to receive data from and provide data to the one or more slow-access-time-mass-storage nodes within the respective second range; and one or more interface nodes, which are adapted to receive input/output (IO) requests from host processors directed to specified LBAs and to direct all the IO requests to the interim-fast-access-time node to which the specified LBAs are assigned;

wherein the plurality of interim-fast-access-time nodes comprise a first and a second interim-fast-access-time node, and wherein at least some of the respective second ranges of the LBAs of the first and the second interim-fast-access-time nodes comprise overlapping LBAs, so that one of the first and the second interim-fast-access-time nodes is operative as a redundant interim-fast-access-time node.

51. A method for transferring data to and from one or more slow-access-time-mass-storage nodes which store data at respective first ranges of logical block addresses (LBAs), comprising:

assigning to a plurality of interim-fast-access-time nodes, configured to operate independently of one another, respective second ranges of the LBAs, all of the second ranges of LBAs comprising a total LBA range;

coupling the plurality of interim-fast-access-time nodes to receive data from and provide data to the one or more slow-access-time-mass-storage nodes having LBAs within the respective second ranges;

receiving input/output (IO) requests from host processors directed to specified LBAs; and directing all the IO requests to the interim-fast-access-time node to which the specified LBAs ate assigned;

wherein the interim-fast-access-time nodes are configured to be reassignable to a new respective second range of the LBAs, all of the new respective second ranges of LBAs comprising the total LBA range.

52. A method according to claim 51, wherein the IO requests are directed to one or more interface nodes, wherein the one or more interface nodes comprise a mapping between the interim-fast-access-time nodes and the LBAs, and wherein the one or more interface nodes are adapted to convert the IO requests to one or more LBA requests and to direct the one or more LBA requests to respective one or more interim-fast-access-time nodes in response to the mapping.

53. A method according to claim 52, wherein the mapping comprises a function relating each specific interim-fast-access-time node of the plurality of interim-fast-access-time nodes to the respective second range of the LBAs.

54. A method according to claim 52, wherein the mapping comprises a table relating each specific interim-fast-access-time node of the plurality of interim-fast-access-time nodes to the respective second range of the LBAs.

55. A method according to claim 52, wherein the data is allocated into groups of data within the one or more stow-access-time-mass-storage nodes according to a pre-defined unit comprising an integral number of bytes of the data, and wherein the mapping comprises a correspondence between the interim-fast-access-time nodes and the groups of data.

56. A method according to claim 51, wherein the one or more slow-access-time-mass-storage nodes comprise one or more disks, and wherein the interim-fast-access-time nodes comprise random access memories.

57. A method according to claim 51, wherein the plurality of interim-fast-access-time nodes comprise respective location tables, wherein each location table comprises locations of the second range of the LBAs assigned to the respective interim-fast-access-time node.

58. A method according to claim 51, wherein the respective second ranges are spread sufficiently evenly and finely so as to generate well-balanced loading for the plurality of interim-fast-access-time nodes.

59. A method according to claim 51, wherein each of the plurality of interim-fast-access-time nodes are at an equal hierarchical level.

60. A method according to claim 51, wherein the respective second ranges of the LBAs do not overlap.

61. A method according to claim 51, wherein the plurality of interim-fast-access-time nodes comprises a first interim-fast-access-time node and a second interim-fast-access-time node, and wherein the first and second interim-fast-access-time nodes have substantially equal capacities.

62. A method according to claim 51, wherein the plurality of interim-fast-access-time nodes comprises a first interim-fast-access-time node and a second interim-fast-access-time node, and wherein the first and second interim-fast-access-time nodes have different capacities.

63. A method according to claim 51, wherein the plurality of interim-fast-access-time nodes comprises a first interim-fast-access-time node and a second interim-fast-access-time node, and wherein the one or more slow-access-time-mass-storage nodes comprise a first slow-access-time-mass-storage node which is coupled to only receive data from and provide data to the first interim-fast-access-time node and a second slow-access-time-mass-storage node which is coupled to only receive data from and provide data to the second interim-fast-access-time node.

64. A method according to claim 51, wherein the plurality of interim-fast-access-time nodes comprises a first interim-fast-access-time node and a second interim-fast-access-time node, and wherein the one or more slow-access-time-mass-storage nodes comprise a first slow-access-time-mass-storage node and a second slow-access-time-mass-storage node which are coupled to receive data from and provide data to the first and the second interim-fast-access-time nodes.

65. A method for transferring data to and from one or more slow-access-time-mass-storage nodes which store data at respective first ranges of logical block addresses (LBAs), comprising:

assigning to a plurality of interim-fast-access-time nodes, configured to operate independently of one another, respective second ranges of LBAs;

coupling the plurality of interim-fast-access-time nodes to receive data from and provide data to the one or more slow-access-time-mass-storage nodes having LBAs within the respective second ranges;

receiving input/output (IO) requests from host processors directed to specified LBAs; and directing all the IO requests to the interim-fast-access-time node to which the specified LBAs are assigned;

wherein the plurality of interim-fast-access-time nodes comprise a first and a second interim-fast-access-time node, and wherein at least some of the respective second ranges of the LBAs of the first and the second interim-fast-access-time nodes comprise overlapping LBAs, so that one of the first and second interim-fast-access-time nodes is operative as a redundant interim-fast-access-time node.

* * * * *